US008964989B2

United States Patent
Grice

(10) Patent No.: US 8,964,989 B2
(45) Date of Patent: Feb. 24, 2015

(54) METHOD FOR ADDING NODES TO A QUANTUM KEY DISTRIBUTION SYSTEM

(71) Applicant: UT-Battelle LLC, Oak Ridge, TN (US)

(72) Inventor: Warren P. Grice, Oak Ridge, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 0 days.

(21) Appl. No.: 14/083,495

(22) Filed: Nov. 19, 2013

(65) Prior Publication Data

US 2014/0233739 A1    Aug. 21, 2014

Related U.S. Application Data

(60) Provisional application No. 61/728,293, filed on Nov. 20, 2012.

(51) Int. Cl.
*H04L 9/08* (2006.01)

(52) U.S. Cl.
CPC ............ *H04L 9/0852* (2013.01); *H04L 9/0855* (2013.01); *H04L 2209/24* (2013.01)
USPC ........... 380/278; 380/256; 380/398; 380/359; 713/169; 713/171

(58) Field of Classification Search
CPC .. H04L 2209/24; H04L 9/0852; H04L 9/0855
USPC ........... 380/278, 256, 398, 359; 713/169, 171
See application file for complete search history.

(56) References Cited

U.S. PATENT DOCUMENTS

| 2004/0184603 | A1 | 9/2004 | Pearson et al. | |
|---|---|---|---|---|
| 2008/0293380 | A1 | 11/2008 | Anderson | |
| 2009/0169015 | A1* | 7/2009 | Watanabe | 380/278 |
| 2010/0293380 | A1* | 11/2010 | Wiseman et al. | 713/169 |
| 2011/0213979 | A1* | 9/2011 | Wiseman et al. | 713/171 |
| 2012/0177201 | A1* | 7/2012 | Ayling et al. | 380/278 |

OTHER PUBLICATIONS

Bennett, C. H. and Brassard, G., "Quantum Cryptography", Public Key Distribution and Coin Tossing, In Proceedings of IEEE Conference on Computers, System and Signal Processing, Bangalore, India, pp. 175-179 (Dec. 1984).*

B. Kraus, N. Gisin, and R. Renner: "Lower and Upper Bounds on the Secret-Key Rate for Quantum Key Distribution Protocols Using One-Way Classical Communication" Phys. Rev. Lett. 95, 080501—Published Aug. 15, 2005.*

(Continued)

*Primary Examiner* — Dant Shaifer Harriman
*Assistant Examiner* — Abiy Getachew
(74) *Attorney, Agent, or Firm* — Warner Norcross & Judd LLP

(57) ABSTRACT

An improved quantum key distribution (QKD) system and method are provided. The system and method introduce new clients at intermediate points along a quantum channel, where any two clients can establish a secret key without the need for a secret meeting between the clients. The new clients perform operations on photons as they pass through nodes in the quantum channel, and participate in a non-secret protocol that is amended to include the new clients. The system and method significantly increase the number of clients that can be supported by a conventional QKD system, with only a modest increase in cost. The system and method are compatible with a variety of QKD schemes, including polarization, time-bin, continuous variable and entanglement QKD.

20 Claims, 3 Drawing Sheets

(56) References Cited

OTHER PUBLICATIONS

International Search Report for PCT Application No. PCT/US2013/070640 mailed Feb. 12, 2014.
Written Opinion of the International Searching Authority for PCT Application No. PCT/US2013/070640 mailed Feb. 12, 2014.
Schmid, Christian et al, "Experimental Single Qubit Quantum Secret Sharing", Physical Review Letters, PRL 95, 230515 (2005) for week ending Dec. 2, 2005, pp. 1-4.
Gisin, Nicolas et al, "Quantum Cryptography", Reviews of Modern Physics, vol. 74, Jan. 2002, published Mar. 8, 2002, pp. 145-195.

* cited by examiner

METHOD FOR ADDING NODES TO A QUANTUM KEY DISTRIBUTION SYSTEM

CROSS-REFERENCE TO RELATED APPLICATIONS

This application claims the benefit of U.S. Provisional Application No. 61/728,293, filed Nov. 20, 2012, the disclosure of which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

1. Field of the Invention

The present invention relates to quantum key distribution for encrypted communications.

2. Description of the Related Art

The following disclosures are incorporated by reference in their entirety: *Experimental Single Qubit Quantum Secret Sharing*, C. Schmid, P. Torjek, M. Bourennane, C. Kurtsiefer, M. Zukowski, and W. Weinfurter, Phsy. Ref. Lett. 95, 230505 (2005); and *Quantum Cryptography*, N. Gisin, G. Ribordy, W. Tittel, and H. Zbinden, Rev. Mod. Phys. 74, 145 (2002).

Quantum key distribution (QKD) involves the application of quantum physics to generate and distribute a shared key for encrypted communications. The security of the key is based on features of quantum physics, rather than assumptions regarding computationally difficult problems. In particular, QKD exploits quantum phenomena to enable communications that can only be intercepted by violating known laws of physics. In recent years QKD systems have been physically demonstrated to be invulnerable to eavesdropping attacks, and commercial QKD systems are presently available for point-to-point secure communication over fiber optic cable.

A classical QKD system is generally configured for two clients, a sender and a receiver. The sender and the receiver share a random series of bits known only to them, which are then used as a secret key for the encryption and decryption of plaintext. For example, the sender sets the quantum state (e.g., polarization state) of binary information, makes a record of how it set the quantum state (e.g., rectilinear basis or diagonal basis), and transmits the information. The receiver measures the quantum state of the binary information and records how it measured the quantum state. The measured quantum state (e.g., 0°, 45°, 90°, 135°) depends on how the receiver measured the binary information. The sender and the receiver share how the binary information was sent and measured across a public channel, and discard the bits that were not sent and measured in the same basis, leaving roughly half of the measured bits as the secret key.

Extending the classical QKD system to more than two clients normally requires a separate QKD link for each pair of nodes. For example, FIG. 1 illustrates an extension of a classical QKD system above for five additional clients. An extension of the classical QKD system of this nature would require significant QKD resources, however, rendering it too expensive for multi-client communications. The disclosure of Schmid et al includes a modified multi-party QKD system in which all but one of the QKD clients confer to privately share their actions to reconstruct a secret. However, this system requires a large secret meeting in order to deduce the actions of the additional client, thereby contributing cost and complexity to the multi-party QKD system.

SUMMARY OF THE INVENTION

An improved QKD system and method are provided. The system and method introduce new clients at intermediate points along a quantum channel, where any two clients can establish a secret key without the need for a secret meeting between the clients. The new clients perform operations on photons as they pass through nodes in the quantum channel, and participate in a non-secret protocol that is amended to include the new clients.

In a first aspect of the invention, a QKD method includes transmitting a quantum signal over a quantum channel from an originating node to a terminating node. The quantum signal includes a plurality of photons that are representative of randomly generated bits. Intermediate clients perform operations on the quantum signal to alter the quantum state of at least some, and optionally all, of the plurality of photons. The operations can include changing polarization in the case of polarization QKD, imparting a phase shift in the case of time-bin QKD, or imparting a phase shift and/or amplitude modulation in the case of continuous variable QKD. During a public communication step, two clients would reveal some of the information about their actions, while all other clients (including the sender and the receiver) would reveal all such information. Based on this information, the two clients discard a portion (~50%) of their data and use the remainder to establish a secret key known only to them. The secret key can be used as a one-time pad or as a symmetric key for encrypted communications.

In a second aspect of the invention, a QKD system includes a quantum sender, a quantum receiver, and a quantum channel. The quantum channel includes a plurality of nodes for performing an operation on a quantum signal being transmitted from the quantum sender to the quantum receiver. Any two designated clients are adapted to determine a shared key with full knowledge of a) the actions of the quantum sender, b) the actions of the quantum receiver, and c) the actions of the other intermediate clients, and with partial knowledge of d) the actions of the other designated client. This information is shared over a public channel, obviating the need for a secret meeting among the clients to the QKD system. The key is generally not shared with the remaining clients, and can be used as a one-time pad or released to a symmetric cryptographic engine for communication between the two designated clients.

The QKD system and method significantly increase the number of clients that can be supported by a conventional QKD system, with only a modest increase in cost. The added nodes can be relatively inexpensive, in some instances less than a few percent of the cost of the base QKD system. The preparation, detection, and stabilization elements remain with the base system, while the intermediate nodes can include relatively inexpensive systems (e.g. phase operators, waveplates). In this way, the QKD system and method invention can bring significant reductions in the cost per QKD client, with the greatest savings realized with large numbers of nodes. In addition, the QKD system and method are compatible with essentially any QKD scheme, including polarization QKD, time-bin QKD, continuous variable QKD, and entanglement QKD.

These and other features and advantages of the present invention will become apparent from the following description of the invention, when viewed in accordance with the accompanying drawings and appended claims.

DETAILED DESCRIPTION OF THE CURRENT EMBODIMENT

The invention as contemplated and disclosed herein includes a system and a method for adding nodes to a QKD system. As set forth below, the system and method introduce new clients at intermediate points along a quantum channel by i) performing operations on photons as they pass through nodes in the quantum channel and ii) taking part in a QKD protocol that is amended to include the new clients. In this manner, a secret key can be established between any two clients on the QKD channel. The client nodes require relatively inexpensive optical components, with most of the expense remaining with the base QKD system. Moreover, the number of clients can be large, limited primarily by the cumulative optical insertion loss.

Figure 1:
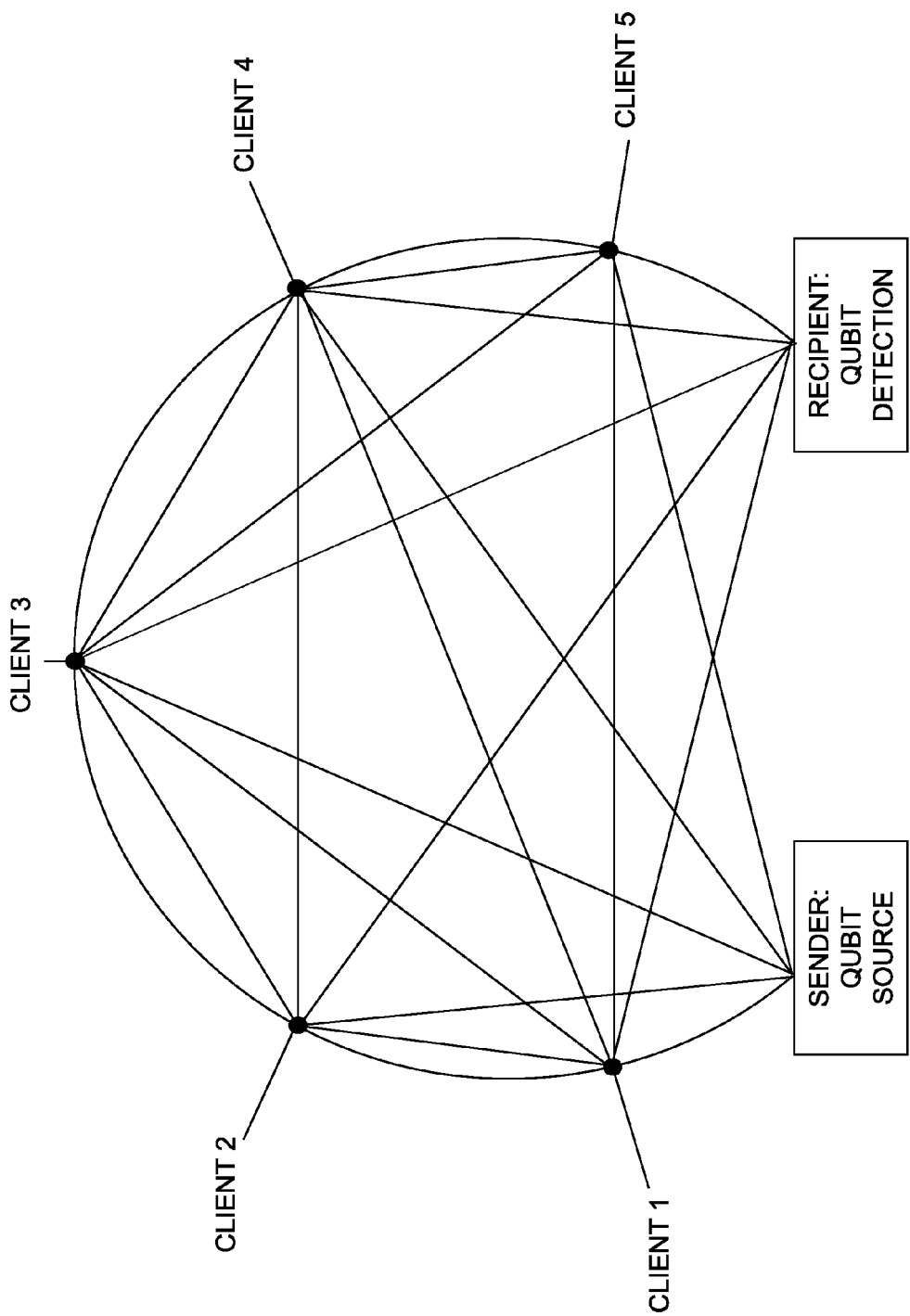
FIG. 1 is a block diagram illustrating a prior art point-to-point quantum key distribution system modified with added channels to accommodate added clients.
Figure 2:
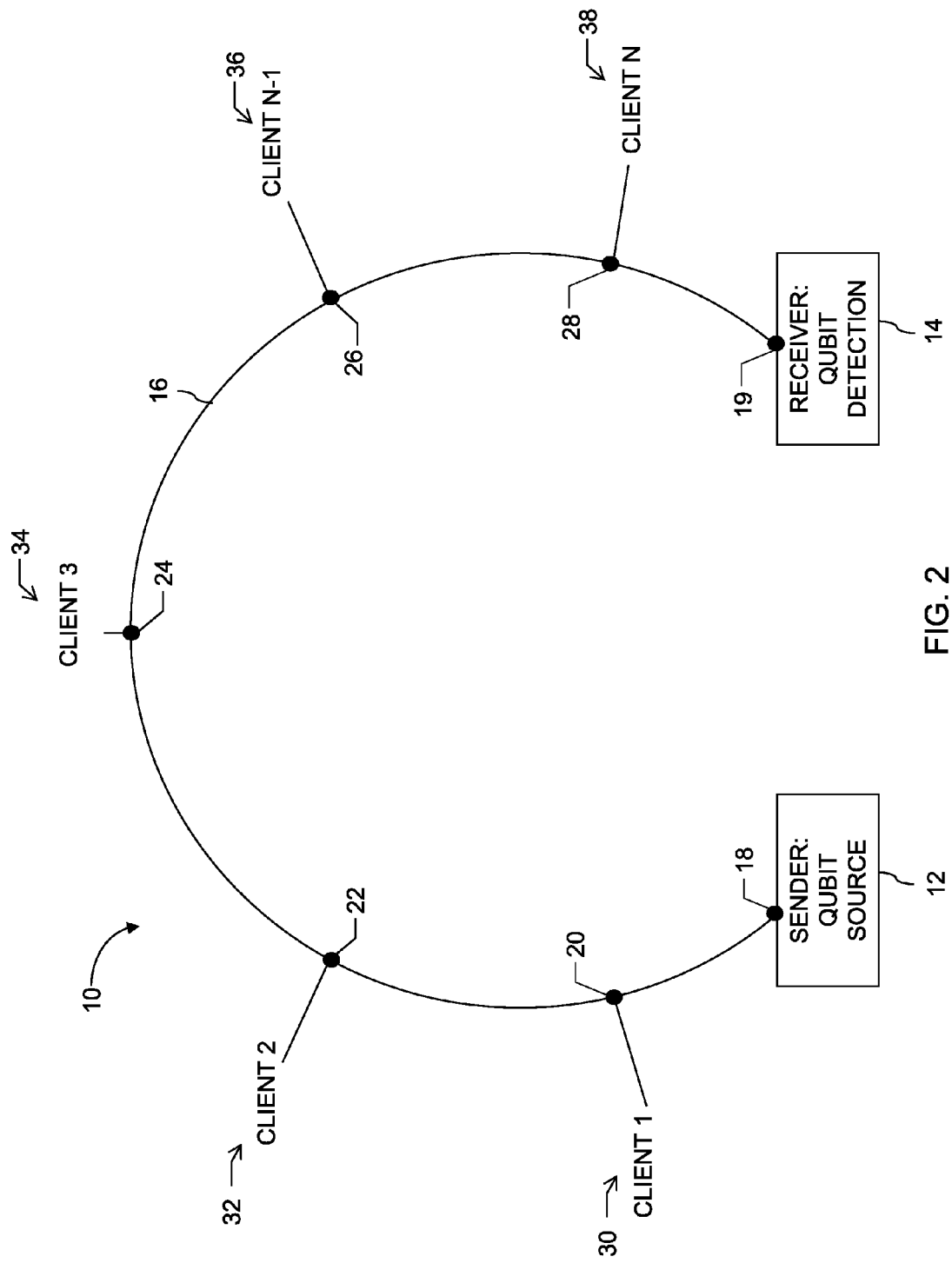
FIG. 2 is a block diagram illustrating a multi-client quantum key distribution system in accordance with an embodiment of the invention.

Referring now to FIG. 2, a QKD system in accordance with one embodiment is illustrated and generally designated 10. The QKD system 10 includes a base QKD system having two clients, a sender (or sending device) 12 and a receiver (or receiving device) 14, connected over a quantum channel 16. The quantum channel 16 can include an optical fiber, while in other embodiments the quantum channel 16 can include an open path through which photons can propagate, e.g. air or space, allowing the wireless transmission of photons. The base system is modified to include additional nodes along the quantum channel 16, corresponding to each new client. In the illustrated embodiment, the quantum channel 16 includes five additional nodes 20, 22, 24, 26, 28 corresponding to five additional or intermediate clients 30, 32, 34, 36, 38. In other embodiments greater or fewer nodes implemented as desired.

During transmission of a quantum signal (i.e., one or more photons) from the sender 12 to the recipient 14, each intermediate client performs an operation on the quantum signal at the respective nodes. Depending on the specific type of QKD, these operations can include, for example, phase shifts or changes in polarization state. Each operation has the effect of transforming a photon from one quantum state to another quantum state (including the possibility of leaving the quantum state unchanged). As a result, the quantum signal travels from the sender 12 to the receiver 14 in a deterministic fashion, allowing the sender 12 and the receiver 14 to carry out QKD, provided all of the intermediate operations are known to them. This capability extends to any two of the intermediate clients as well. That is, the system 10 can support QKD between any pair of nodes (including original nodes 18 and 19), as long as the actions of the other clients are known.

The additional client nodes are accommodated into the QKD protocol with reference to the following example. If client-2 and client-3 wish to establish a secret key, they publicly disclose only a portion of the information about the operations they performed on each photon. This partial public disclosure generally includes the choice of operation basis by client-2 and client-3. The remaining clients disclose all of the information about their operations. This disclosure includes both the choice of operation basis and the operation performed within that basis. In addition, the sender 12 and the receiver 14 disclose the original quantum state, the transmission basis, the measured quantum state, and the measurement basis. Using this information, client-2 and client-3 would discard roughly half of the cases, leaving them with shared secret information. The additional information disclosed does not in any way reveal the content of the information being shared between client-2 and client-3, however.

The system and method of the present invention can be implemented with any of the various QKD schemes, whether now known or hereinafter developed. For example, the system and method of the present invention can be implemented with polarization QKD, time-bin QKD, and continuous variable QKD. In the case of polarization QKD, each client would change the polarization state. In the case of time-bin QKD, each client would implement a phase shift on one time bin with respect to the other. In the case of continuous variable QKD, each client would implement a phase shift and/or an amplitude modulation. As discussed in connection with FIG. 3 below, these same types of actions are adaptable to entangled photon schemes as well.

The multi-client system and method of the present invention is described in connection with equations (1) through (4) below. The present method includes preparing a qubit in an initial state by the sender 12:

$$|+x\rangle = \frac{1}{\sqrt{2}}(|0\rangle + |1\rangle) \qquad (1)$$

The qubit is then communicated from client to client, each acting on it with the unitary phase operator $\hat{U}_j(\phi_j)$ and with a randomly chosen phase $\phi_j$:

$$\hat{U}_j(\varphi_j) = \begin{cases} |0\rangle \to |0\rangle \\ |1\rangle \to e^{i\varphi_j}|1\rangle \end{cases} \qquad (2)$$

$$\varphi_j \in \left\{0, \pi, \frac{\pi}{2}, \frac{3\pi}{2}\right\} \qquad (3)$$

The last party in the communication chain performs a measurement on the qubit in the $|\pm x\rangle$ basis, with the expectation value being:

$$E = \cos(\Sigma_j^N \phi_j) \qquad (4)$$

All but two parties in the communication chain announce complete information regarding their operations. For example, N−2 clients announce the choice of basis $\phi_j \in \{0, \pi\}$ or $\phi_j \in \{\pi/2, 3\pi/2\}$, representing one bit, and the particular value of $\phi_j$, representing another bit. The two remaining clients (the "designated clients") announce only one such bit: the choice of basis. From this information, each designated client can deduce the operations of N−2 clients and the other designated client. For approximately 50% of the qubits, the cumulative phase shift will be an integer multiple of π. Using the disclosed information (basis choice), these cases are identified by the designated clients and the other cases are discarded. For the retained cases, each designated client can use the disclosed information in combination with his (or her) own undisclosed information to deduce the specific operation by the other designated client. By deducing the undisclosed operations of the other designated client, the two designated clients can establish a secret key. The secret key may be used as a 'one time pad,' to encrypt a message between the designated clients. The secret key may also be used in an encryption algorithm, including for example AES or DES.

As noted above, the multi-client QKD system and method of the present invention is applicable to polarization QKD. In conventional polarization QKD, the sender transmits a photon that is polarized in a predetermined direction using a polarization filter and birefringent elements: for example, horizontal linear polarization (H), vertical linear polarization (V), left circular polarization (L), or right circular polarization (R). The receiver measures the polarization of the photon using a first measuring device that identifies polarized light in the horizontal and vertical directions (H and V) or a second measuring device that identifies polarized light in the diagonal directions (L and R). The client nodes added to the conventional polarization QKD system modify the polarization of the photon using a sequence of waveplates. The transformations can be cyclic (H→R→V→L→H→...), so that each new client's operation will consist of applying 0, 1, 2, or 3 "steps" in this cycle. The receiver then makes a measurement in either the linear basis (H, V) or circular basis (L, R). Any two of the intermediate clients (the two designated clients) would reveal some of the information about their actions, while the remaining clients, including the sender and the receiver, reveal all the information about their actions. Using this information, the designated clients deduce the operations of the remaining clients, leaving them with shared secret information, and in particular, a shared key known only to the designated clients.

The multi-client QKD system and method of the present invention is also applicable to time-bin QKD, which relies on single-photon interferences between nearby time slots, or bins. In conventional time-bin QKD, the sender prepares the photon by passing it through an interferometer with one arm much longer than the other, thereby placing the photon in a superposition of two different time bins. Interference is observed in an identical mis-matched interferometer monitored by the receiver. The two interferometers also include elements that apply relative phase shifts between the time bins. The sender applies phases shifts of 0, $\lambda/2$, $\pi$, or $3\pi/2$; while the receiver applies either 0 or $\pi/2$. When the sender and receiver choose the same basis (0, $\pi$; or $\pi/2$, $3\pi/2$), they share secret information: the receiver knows the original state; and the sender knows whether the observed interference was constructive or destructive. The client nodes added to the system modify the time-bin state by adjusting the relative phase between the time bins by 0, $\pi/2$, $\pi$, or $3\pi/2$. This requires a phase-shifter fast enough to act on one time bin, while leaving the other unchanged. For example, the intermediate node can include a high-speed phase modulator to discriminately introduce a phase shift to the sender's photons in the (0, $\pi$) or ($\pi/2$, $3\pi/2$) basis. Any two of the intermediate clients (the two designated clients) would reveal some of the information about their actions, while the remaining clients, including the sender and the receiver, reveal all the information about their actions. Using this information, the two designated clients deduce the operations of the remaining clients, leaving them with shared secret information, and in particular, a shared key known only to the two designated clients.

As noted above, the present invention incorporates by reference the disclosure of C. Schmid, P. Torjek, M. Bourennane, C. Kurtsiefer, M. Zukowski, and W. Weinfurter, Phsy. Ref. Lett. 95, 230505 (2005). In this disclosure, multiple QKD clients confer and privately share their actions to reconstruct a secret. By doing so, they have enough information to deduce a client's actions. One drawback of this prior scheme is the need for a large secret meeting in order to deduce the client's actions. In the present method, by contrast, the large secret meeting is replaced with complete declarations by N-2 clients, and partial declarations by the remaining two clients. With this information, these remaining two clients can establish a secret key known only to them, and not to the N-2 clients or to an eavesdropping third party, and without the need for a secret meeting.

To reiterate, the system 10 of the present invention generally includes a quantum sender 12, a quantum receiver 14, and a quantum channel 16 between the quantum sender 12 and the quantum receiver 14. The quantum sender 12 is adapted to transmit a random bit sequence as a plurality of photons each having a predetermined quantum state. The quantum receiver 14 is adapted to measure the quantum state of the plurality of photons transmitted by the quantum sender and to share, over a public communication path, the measured quantum state and the measurement basis. The quantum channel 16 includes intermediate nodes adapted to perform an operation capable of altering the quantum state of at least one of the plurality of photons transmitted by the quantum sender 12. Any two intermediate clients, referred to as "designated clients" or "first and second clients" for convenience (e.g., client-2 and client-3), are adapted to determine a shared encryption key with knowledge of the following publicly revealed information: a) the quantum state and transmission basis of the plurality of photons sent by the quantum sender 12, b) the quantum state and measurement basis of the plurality of photons measured by the quantum receiver 14, c) the basis of operation and the particular operation within that basis performed on the plurality of photons by other than the first and second clients, and d) the basis of operation by the first and second clients. The publicly revealed information is shared over a public communication path, which is different from the quantum channel 16 in the present embodiment, and is generally not subject to encryption using a key from the QKD system 10. The public communication path can be a conventional communications channel over the internet or other network (e.g., radio, telephone, wireless, optical). The operation(s) performed on the photons can include polarization shifts in the case of polarization QKD, implementing a phase shift in the case of time-bin QKD, or implementing a phase shift and/or amplitude modulation in the case of continuous variable QKD. The shared encryption key is generally not shared with other than the first and second clients in this example, and it is generally not known by the remaining clients, including the sender 12 or the receiver 14. The quantum communication channel 16 can include an optical fiber in some embodiments, while in other embodiments the quantum communication channel 16 is generally free from an optical fiber, e.g., free space. The additional nodes can include any device adapted to perform an operation on a photon, including for example a phase-shifter or a waveplate.

Operation of the multi-client QKD system 10 generally includes transmitting a quantum signal over the quantum channel 16 from an originating node 18 associated with the quantum sender 12 to a terminating node 19 associated with a quantum receiver 14. The quantum signal includes a plurality of photons representative of a plurality of randomly generated bits. Each intermediate node 20, 22, 24, 26, 28 performs operations on the quantum signal to alter the quantum state of at least some of the plurality of photons. The operations can include changing polarization in some embodiments, while in other embodiments the operations can include inducing a phase shift. Other operations can be performed in other embodiments where desired. The quantum receiver 14 measures the quantum state and the measurement basis of each photon in the quantum signal, and reveals this information to two designated clients 32, 34, and potentially all of the clients, over the public communication path. Similarly, the sender 12 reveals the quantum state of each sent photon in the quantum signal, as well as the corresponding transmission basis, to the two designated clients 32, 34, and potentially all of the clients, over the public communication path. The remaining intermediate clients 30, 36, 38 reveal their operations performed on the photons to the designated clients 32, 34, and potentially all of the clients (including the sender 12 and the receiver 14). This disclosure includes both the choice of basis, representing one bit, and the particular operation, representing another bit. The designated clients 32, 34 reveal only the choice of basis. Using this revealed information, the designated clients 32, 34 discard ~50% of the qubits and can establish a secret key with the remainder. The secret key is known only to the designated clients 32, 34, and not to the remaining clients 12, 14, 30, 36, 38. Establishing a secret key can include discarding a portion of the randomly generated bits from the quantum signal, optionally approximately 50% of the randomly generated bits. The secret key can be used as a one-time pad for secret communications between the designated intermediate clients 32, 34, while in other embodiments the secret key can be released to a symmetric cryptographic engine for secret communications between the designated clients 32, 34.

Figure 3:
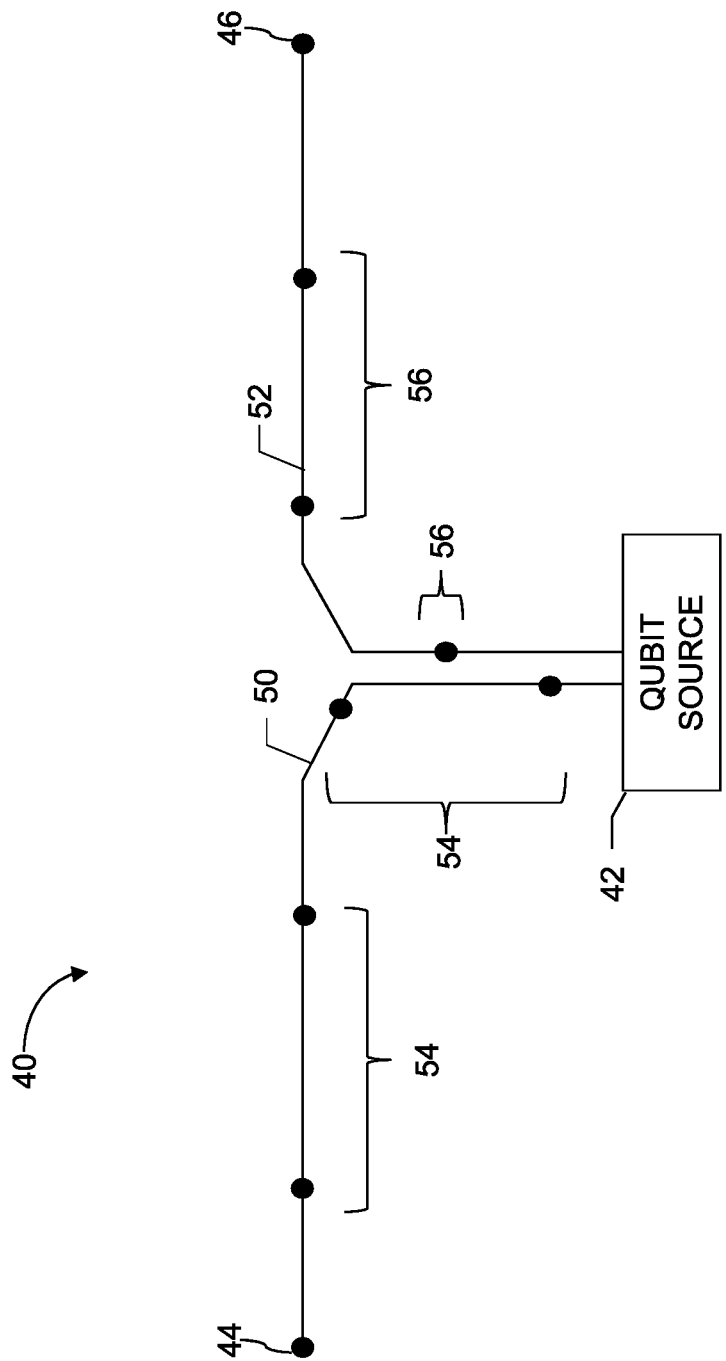
FIG. 3 is a block diagram illustrating a multi-client quantum key distribution system in accordance with another embodiment of the invention.

Referring now to FIG. 3, a multi-party entanglement QKD system in accordance with one embodiment is illustrated and generally designated 40. The QKD system 40 includes a base entanglement QKD system having a source of entangled photon pairs 42, two terminating nodes 44, 46, and a quantum channel including a first quantum path 50 ending at the first terminating node 44 and a second quantum path 52 ending at the second terminating node 46. Operation of the base entanglement system involves the transmission of entangled photon pairs from the quantum source 46 and the measurement of each photon at the respective terminating nodes 44, 46. The two clients associated with the terminating nodes 44, 46 (conventionally referred to as Alice and Bob) share information across a public channel regarding the measurement bases. Using this information, they discard ~50% of the cases and use the remainder to establish a secret key. This base system is modified with the inclusion of a first and second plurality of intermediates nodes 54, 56 on respective first and second quantum paths 50, 52 of the quantum channel. As set forth above in connection with the embodiment of FIG. 2, new clients at the intermediate nodes 54, 56 perform operations on photons as they pass through the intermediate nodes 54, 56 and participate in a QKD protocol that is amended to include the new clients. The QKD protocol includes sharing, optionally over a public communication channel, the measurement basis and quantum state at each terminating node 44, 46. The QKD protocol additionally includes sharing, optionally over the public communication channel, the basis of operation (e.g., HV or LR) and the operation within that basis (e.g., H or V for HV, or L or R for LR) by all but two of the designated clients, where the two designated clients occupy nodes on opposing quantum paths 50, 52 or on the same quantum path 50 or 52. The designated clients then share, optionally over the public communications channel, the basis of operation (e.g., HV or LR). Using the shared information, the two designated clients can deduce the operations of the remaining clients, leaving them with shared secret information, and in particular, a shared key known only to the two designated clients, but not to the remaining clients, or to an eavesdropping third party.

The multi-client QKD system and method of the present invention are suitable for a variety of applications. For example, the multi-client QKD system can be used in conjunction with existing grid-based communication protocols (e.g., IEC61850 and DNP3), particularly in view of the relatively low data rates (<1 Mbps) and limited transmission distances (<20 km) needed for grid communication networks. The additional nodes can be relatively inexpensive, in some instances less than a few percent of the cost of a base QKD system. The preparation, detection, and stabilization elements remain with the base system, while the intermediate nodes can include relatively inexpensive components, including for example phase modulators in time-bin QKD. In this way, the system and method of the present invention can bring significant reductions in the cost per QKD client, with the greatest savings realized with large numbers of nodes.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

The invention claimed is:

1. A method for generating a key among first and second designated clients in a multi-party quantum key distribution system comprising:
   providing a quantum channel including a plurality of nodes including:
     an originating node,
     a terminating node, and
     a plurality of intermediate nodes, wherein the first designated client is associated with a first intermediate node $N_i$ and wherein the second designated client is associated with a second intermediate node $N_j$;
   transmitting a quantum signal over the quantum channel from the originating node to the terminating node, the quantum signal including a plurality of photons representative of a plurality of bits;
   performing an operation on the quantum signal at each of the intermediate nodes;
   revealing via a public communication path, a) complete information regarding the transmission of the plurality of photons at the originating node, b) complete information regarding the measurement of the plurality of photons at the terminating node, c) complete information regarding the operation performed at the plurality of intermediates nodes except $N_i$ and $N_j$, d) partial information regarding the operation performed at intermediate node $N_i$, and e) partial information regarding the operation performed at intermediate node $N_j$; and determining, at the first and second designated clients, a cryptographic key shared between the first and second designated clients based on the revealed information.

2. The method according to claim 1 wherein the complete information regarding the transmission of the plurality of photons includes the transmission basis and the quantum state for each of the plurality of photons.

3. The method according to claim 1 wherein the complete information regarding the measurement of the plurality of photons includes the measurement basis and the quantum state for each of the plurality of photons.

4. The method according to claim 1 wherein the complete information regarding the operation performed at the plurality of intermediates nodes includes a basis of operation and an operation within the basis of operation.

5. The method according to claim 4 wherein the operation within the basis of operation includes at least one of a phase shift and a polarization shift.

6. The method according to claim 1 wherein the partial information regarding the operation performed at intermediate node $N_i$ and $N_j$ each include a basis of operation for each of the plurality of photons.

7. A multi-client quantum key distribution system comprising:
   a quantum sender adapted to transmit a random bit sequence as a plurality of photons each having a predetermined quantum state; and
   a quantum receiver adapted to measure the quantum state of the plurality of photons transmitted by the quantum sender; and
   a quantum channel between the quantum sender and the quantum receiver, wherein the quantum channel includes a plurality of nodes adapted to perform an operation capable of altering the quantum state of at least one of the plurality of photons transmitted by the quantum sender;
   wherein first and second clients associated with first and second ones of the plurality of nodes are adapted to determine a cryptographic key with knowledge of shared information including a) the quantum state and basis of the plurality of photons at the originating node set by the quantum sender, b) the quantum state and basis of the plurality of photons measured by the quantum receiver at the terminating node, and c) the basis choice and operation performed on the plurality of photons at each of the intermediate nodes except a first intermediate node associated with the first client and a second intermediate node associated with the second client, wherein the shared information is communicated over a public communications path.

8. The multi-client quantum key distribution system of claim 7, wherein the operation includes rotating a polarization of at least one of the plurality of photons.

9. The multi-client quantum key distribution system of claim 7, wherein the operation includes implementing a phase shift of at least one of the plurality of photons.

10. The multi-client quantum key distribution system of claim 7, wherein the cryptographic key is not shared with other than the first and second clients.

11. The multi-client quantum key distribution system of claim 7, wherein each of the plurality of nodes includes a phase-shifter.

12. The multi-client quantum key distribution system of claim 7, wherein the quantum channel includes an optical fiber.

13. A method of quantum key distribution comprising:
   providing a quantum channel including a plurality of nodes associated with a corresponding plurality of clients, the plurality of nodes including:
      an originating node,
      a terminating node, and
      a plurality of intermediate nodes;
   transmitting a quantum signal including a plurality of photons over the quantum channel from the originating node to the terminating node;
   performing an operation on the quantum signal at each of the intermediate nodes, wherein the operation is capable of changing the quantum state of at least one of the plurality of photons in the quantum signal;
   making public to a first client associated with a first one of the plurality of nodes and a second client associated with a second one of the plurality of nodes:
      a) the quantum state and the transmission basis of the plurality of photons at the originating node,
      b) the quantum state and the measurement basis of the plurality of photons at the terminating node,
      c) the choice of basis and the operation performed on the quantum signal at each of the intermediate nodes by all except the first client and the second client;
      d) the choice of basis by the first client and the second client; and
   determining a cryptographic key shared between the first client and second client.

14. The method according to claim 13 wherein the cryptographic key is known to the first and second clients but not to the remainder of the plurality of clients.

15. The method according to claim 14 wherein the cryptographic key is not shared with other than the first and second clients.

16. The method according to claim 13 wherein the operation includes rotating a polarization of at least one of the plurality of photons.

17. The method according to claim 13 wherein the operation includes implementing a phase shift of at least one of the plurality of photons.

18. The method according to claim 13 further including implementing the cryptographic key with an electrical grid communications protocol.

19. The method according to claim 13 wherein further including releasing the cryptographic key to a symmetric cryptographic engine.

20. A method for generating a key among first and second designated clients in a multi-party entanglement quantum key distribution system comprising:
   providing a first quantum path including a first terminating node and a first plurality of intermediate nodes, the first plurality of intermediate nodes including intermediate node $N_i$ associated with the first designated client;
   providing a second quantum path including a second terminating node and a second plurality of intermediate nodes, the second plurality of intermediate nodes including intermediate node $N_j$ associated with the second designated client;
   transmitting first and second photons of an entangled photon pair over the first and second quantum paths, respectively;

performing an operation on the entangled photon pair at each node of the first and second plurality intermediate nodes;

measuring the quantum state of the entangled photon pair at the first and second terminating nodes;

revealing to the first and second designated clients over a public communication path: a) complete information regarding the measurement of the entangled photon pair at the terminating nodes, b) complete information regarding the operations performed at the plurality of intermediates nodes, c) partial information regarding the operation performed at intermediate node $N_i$, and d) partial information regarding the operation performed at intermediate node $N_j$; and determining, at the first and second designated clients, a cryptographic key shared between the first and second designated clients based on the revealed information.

* * * * *